*M. Tritchell,*
*Brick Machine,*
No 3,622.   Patented June 10, 1844.
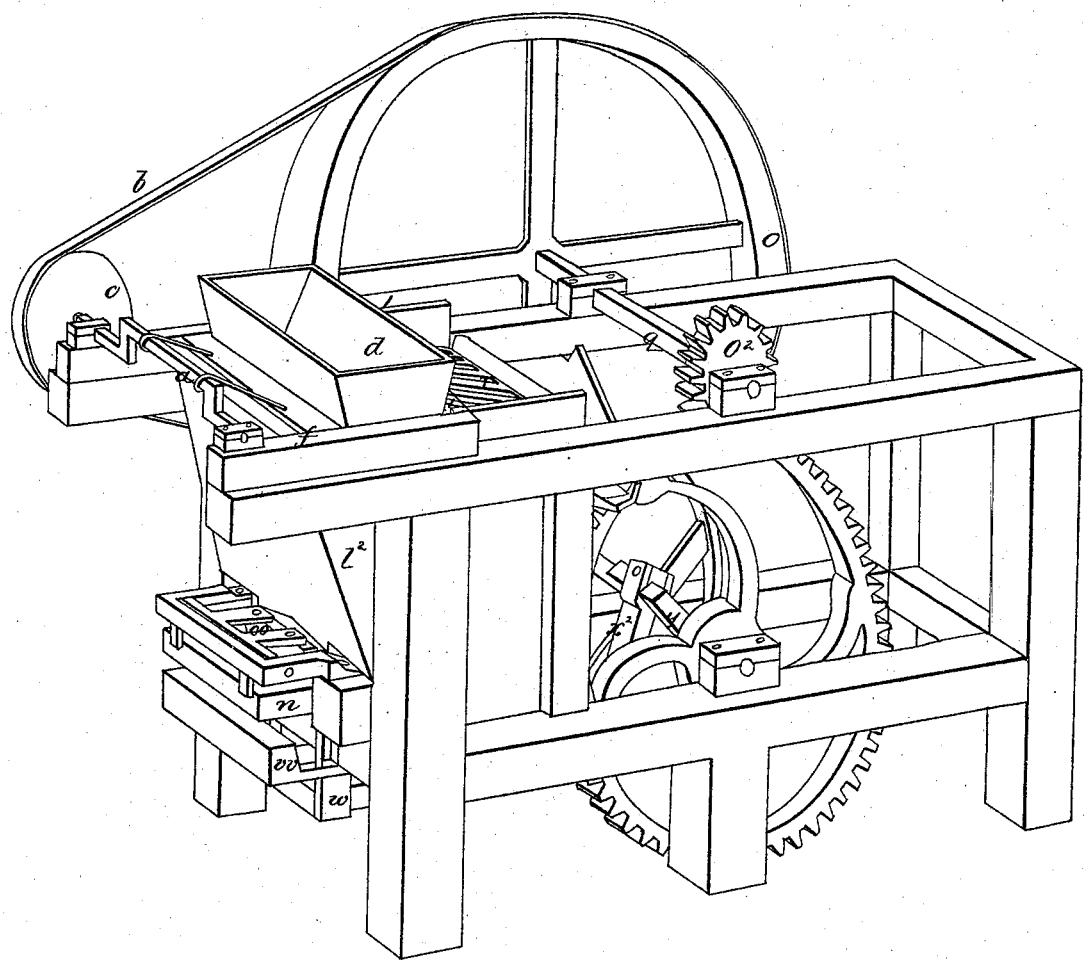

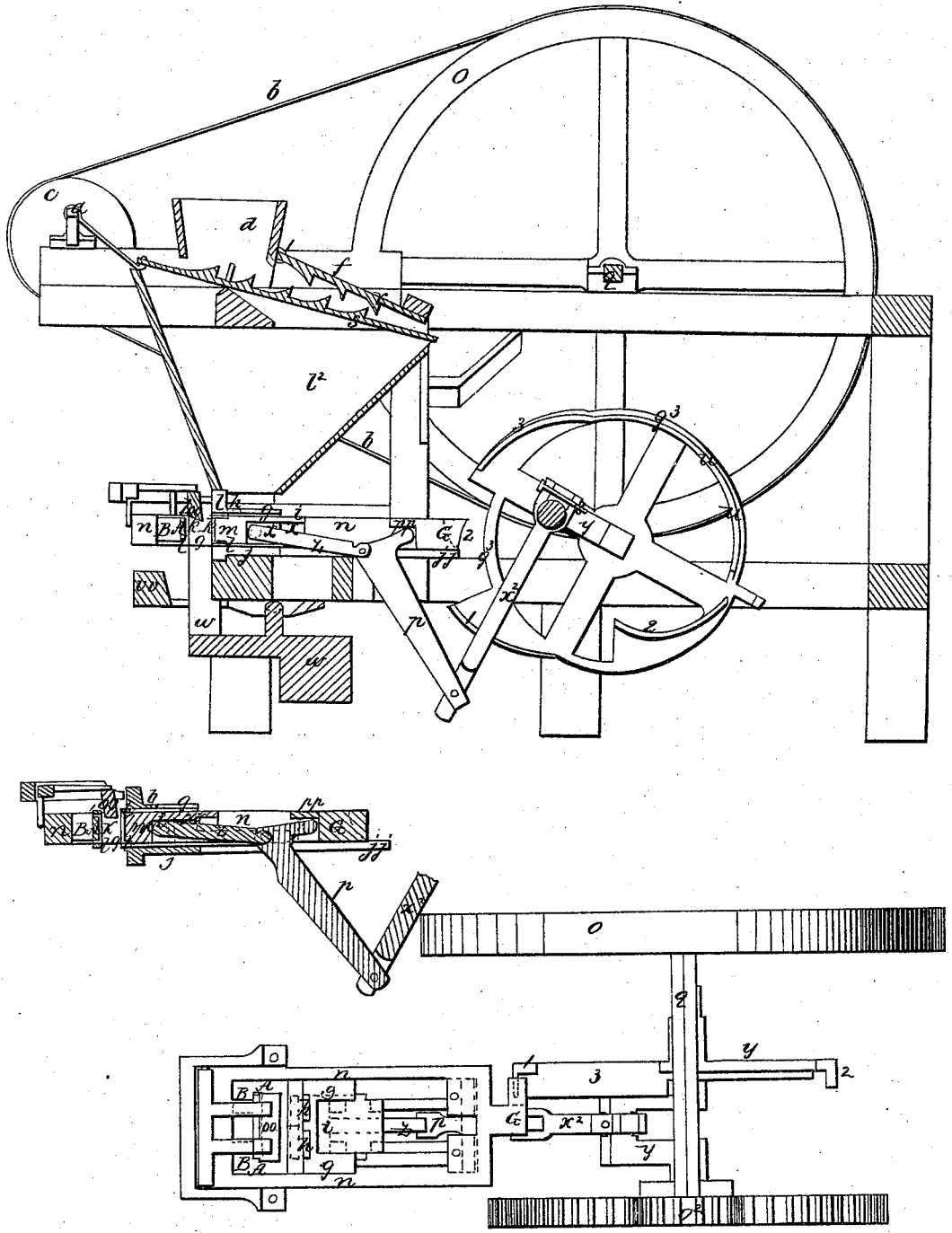

UNITED STATES PATENT OFFICE.

MARK TWITCHELL, OF GRAY, MAINE.

BRICK-PRESS.

Specification of Letters Patent No. 3,622, dated June 10, 1844.

*To all whom it may concern:*

Be it known that I, MARK TWITCHELL, of Gray, in the county of Cumberland and State of Maine, have invented a new and Improved Mode of Pressing Bricks from Damp Clay; and I do hereby declare the following to be a full and exact description.

This machine consists of a pulverizer to prepare the clay, a mold for the bricks to be pressed in, a carriage, two pistons, a lever, elbow, and crank and a camwheel to press and relieve the bricks from the mold and a small press to loosen the bricks from the pistons.

To enable others skilled in the art to make and use my invention I will now proceed to describe its construction and operation. I have hopper, $d$, to hold the clay to be pulverized, it extends from side to side of the machine and rests on the beams at the sides of the machine: It is a foot wide at the bottom widening to the top and rests on the frame, $f$. The pulverizer ($r$ and $s$) is under the hopper and extends one foot on an angle of seven degrees downward toward the camwheel. It is of two parts ($r$, the upper and $s$, the under) one above the other, each part is composed of parallel saws set so close together as to sift the clay as well as to pulverize it; the saws are about two inches broad with teeth like a millsaw, six inches apart, and as the pulverizer slopes downward the cut of the teeth is downward. The saws in the under part, $s$, are three feet long, and run on a beam which is across the machine, and on rests in the sidebeams of the machine, (on which the hopper is placed.) This part, $s$, is moved by a crank, $a$, of three inch sweep on which there is a pulley, $c$, of ten inches in diameter which is turned by a belt, $b$, going around a drum, O, of eight feet in diameter. This drum is on the same shaft as the cogwheel which moves the camwheel. The cogwheel, $o^2$, the shaft, $q$.

The upper part, $r$, is hung on hinges 11, to let it rise to let off anything too hard to be pulverized; these hinges connect the upper corners of this part to the lower part of the hopper; at which place, this part, $r$, is two inches from the lower part, $s$, but this part slopes more than the lower so that at its extremity the teeth lock in their whole length. The saws in this part are one foot long; in each part the saws are set equally close, so that when the under part, $s$, moves, every saw runs between corresponding saws of the upper part, $r$. The clay being pulverized falls into a box, $C^2$, it is three feet long at the top and one foot at the bottom, it holds the pulverized clay ready to be pressed; it rests on the molds $g\ g$.

The mold, $g\ g$, is directly under the box, it is ten inches long from the front to the back part, six of which in the back part, $i$, is open at the top to receive the clay, the other four inches is inclosed except vents to let off the surplus clay. These vents, $h$, have the thickness of the brick from the front of the molds. The mold lies horizontally so that when the brick is pressed it is with its edge up between the pistons. On each side of the mold, on a level with the lower edge of the brick are rests for the carriage to run on: Two of these, $j$, come to the front of the mold; the other two, $j\ j$, are even with the back part of the carriage, when the carriage is shoved forward. The vents, $h$, run across the mold and are half of an inch broad, and are on the top of the mold to let the clay off into the box.

The carriage, $n$, is an oblong square wide enough to straddle the mold. To the forward part of the carriage (running back six inches) are arms, B, to which is attached the forward piston, A, so the piston can run six inches into the mold; in the back part of the carriage is an aperture, $p\ p$, to receive the lever, $p$, in this aperture the lever plays on a roller. On the carriage back of the square part, and six inches from it, is a horizontal projection united to the carriage by an arm, G, this projection, Q, is fitted to the cams on the camwheel, $y$, so that cam, 1, is hooked in to draw the carriage back and cams 2 and 3 push against it and shove the carriage forward. The carriage is about three feet long.

The pistons, A and $m$, are made to fit the mold and are faced with leather, gum elastic or felt to keep the clay from sticking to the pistons. Around the edges of the pistons are caststeel bands, $l$, to hold on the leather, $k$, and to keep the pistons from wearing; they are screwed to the edges of the pistons which make the pistons fit the molds. The back piston in which is the one which moves while the brick is pressing has an aperture, $x, x$, coming to within six inches of the face of the piston for the elbow to play in; over this aperture to the extremity of the piston (eight inches) is an apron to shut off the clay from the open part of the mold, $i$, while the piston is shoved to take the brick from the mold. [The forward piston is described with the carriage to which it is attached.]

The camwheel $y\ y\ y$, is three feet in diameter and has cams on the side of the wheel extending six inches from the rim. Cam 1 is seventeen inches long and draws back the carriage seven inches; cam 2 is seventeen inches long and shoves the carriage three and a half inches to the place of pressure; this cam is within the circumference of the wheel so that its extremity comes to the center of the rim of the wheel, there is a flange, $u\ u$, from cam 2 to 3 to hold the carriage while the brick is pressing; it extends out one inch and comes to the center of the rim; cam 3 is seventeen inches long and shoves the carriage three and half inches and takes the brick from the mold.

The lever $p$ hangs in the back part of the carriage on a roller, extending forward six inches as a part of the elbow, and downward twenty inches as a lever, to a connecting rod uniting it with the crank $y$ the wheel is hung on. This connecting rod $r^2$ must be long enough to straighten the elbow but no longer; it plays on the crank (of nine inch sweep) so that by pushing the lower part of the lever eighteen inches the elbow is straightened which shoves the piston two and half inches; (this is for bricks $2\frac{1}{2}$ inches thick.) The lever makes a part of the elbow, $z$, the other part has a joint fitted to the lever, and a roller on the other end to play in the aperture, $x\ x$, in the piston, $m$; the elbow part of the lever wants a little of being square with the lever part.

The motion of the crank and lever must harmonize with the cam, so that as soon as the pistons are opened, cam 2 must begin to shove the carriage to the place of pressure which must be done by the time the crank is so turned as to begin to press, then as soon as the brick is pressed cam 3 must begin to shove it from the mold.

The small press, $o\ o$, that loosens the brick from the piston is of the length and thickness of the brick where it comes on it; it first extends upward six inches, then forward to the extremity of the carriage (when the carriage is shoved forward), then downward so far as to have the carriage take it and bring the press down on the brick. The brick falls on a balance, $w$, hung under the mold with the end opposite the mold the heaviest to bring it back to its place when the brick is off, the part under the brick projects upward nearly to the brick. The table, $v\ v$, is outside of the balance six inches below the mold so that when the brick is clear from the piston it falls over on the table, which is eight inches wide and one foot long. Any convenient number of molds may be operated in the same manner as the one described by double cranks &c.

The proper speed is to have the camwheel make twelve revolutions in a minute.

I claim—

1. The construction of the pulverizer as set forth, the arrangement of the vent to let off the surplus clay into the box or hopper, facing the pistons with felt, gum elastic or leather, and the combination of the small press for discharging the brick with the brick press, said small press being constructed and arranged as described.

2. I also claim the mode of operating the press by means of the elbow $z$ and lever $p$, operated by a connecting rod and crank in combination with the several cams upon the wheel, said cams acting in unison with the lever and carriage, the whole being constructed and operating as set forth.

In testimony that the above is a true specification of my said improvement as above described, I have hereunto set my hand and seal this twenty seventh day of May eighteen hundred and forty four.

MARK TWITCHELL. [L. S.]

In presence of—
 MESHACH HUMPHREY,
 THOMAS HANCOCK.